Jan. 17, 1950
J. J. JURSINOVIC
2,494,764
CONTROL MECHANISM FOR CHUCKS
Filed July 3, 1948
3 Sheets-Sheet 1
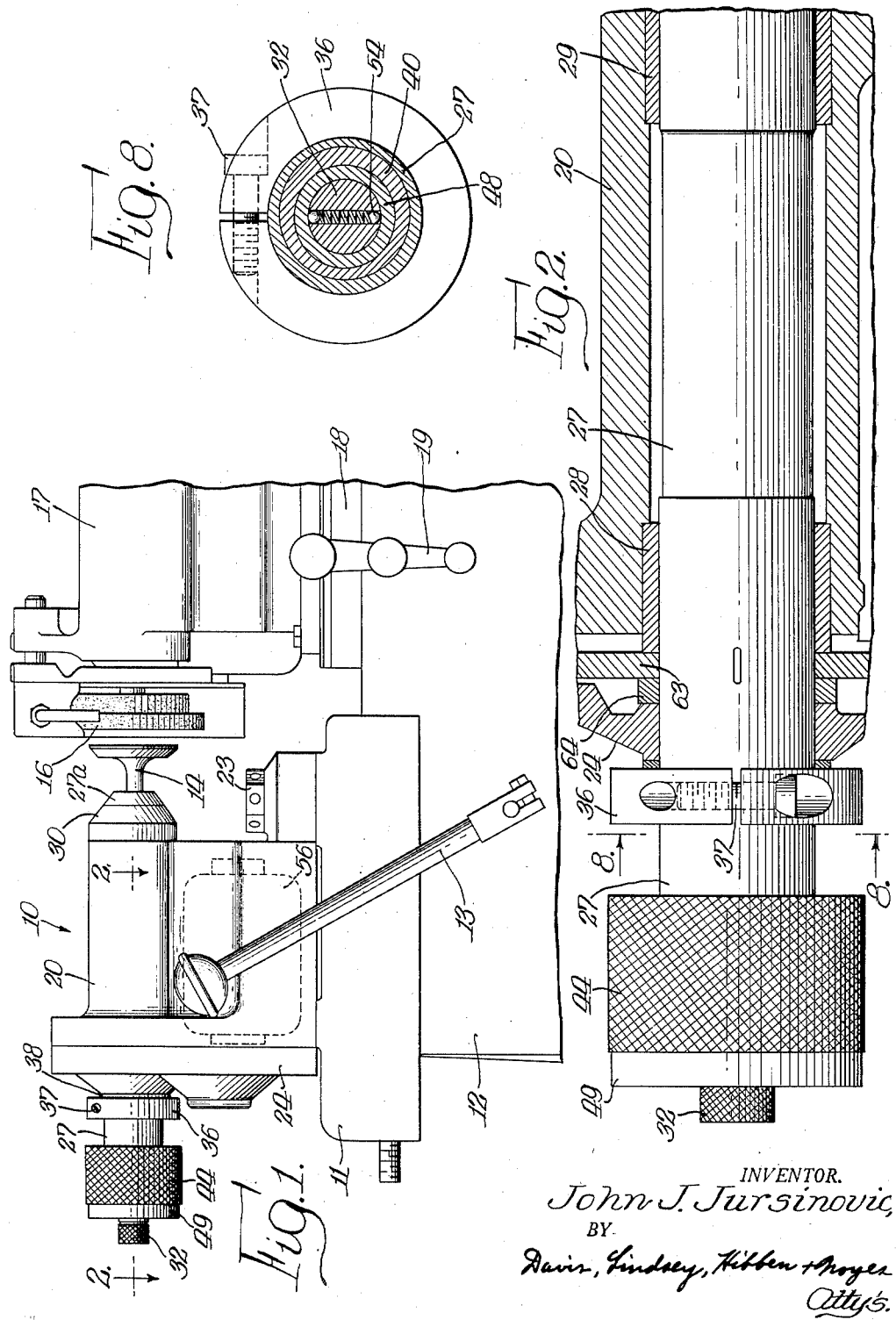
INVENTOR.
John J. Jursinovic,
BY
Davis, Lindsey, Hibben + Noyes
Attys.

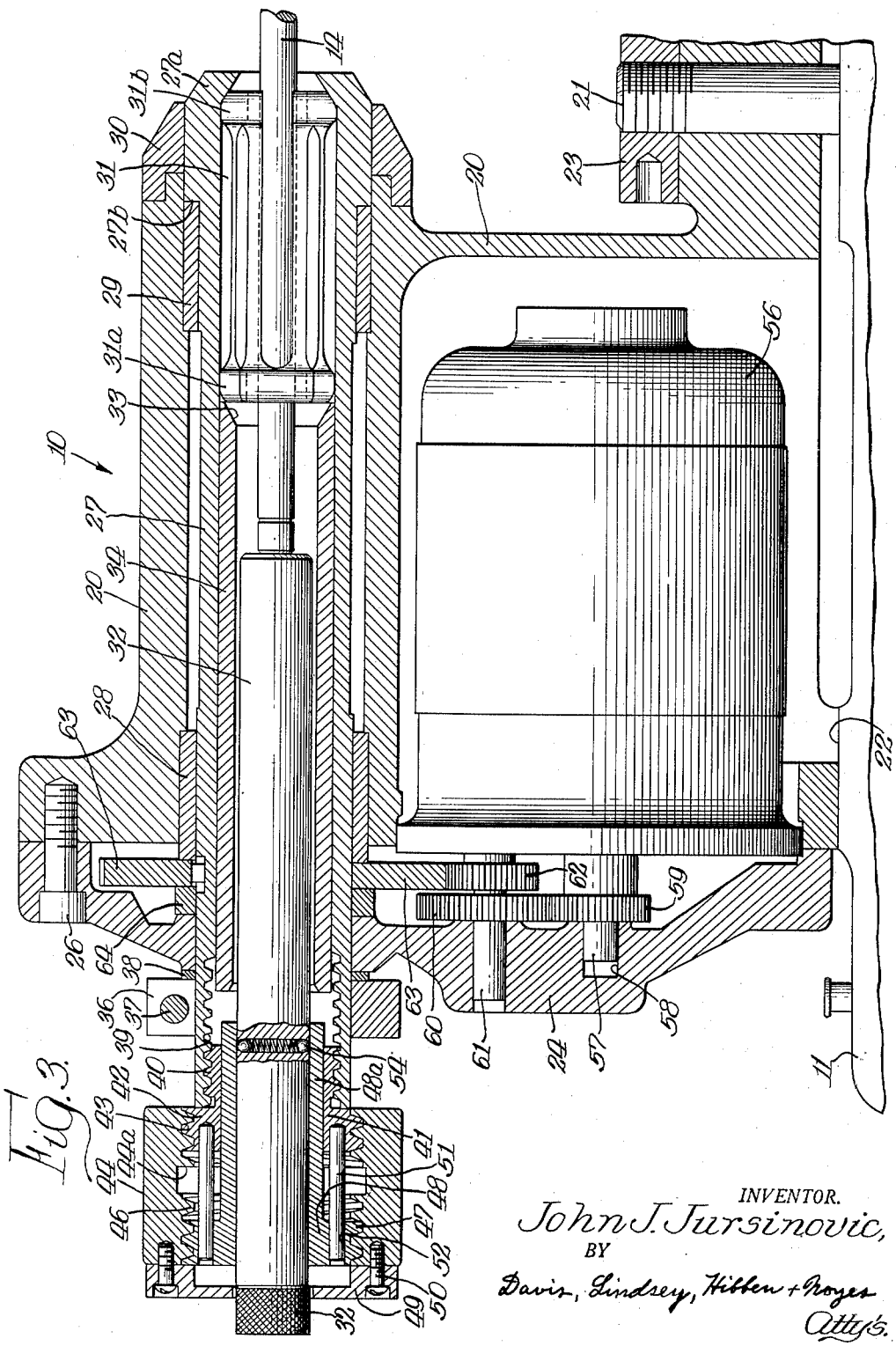

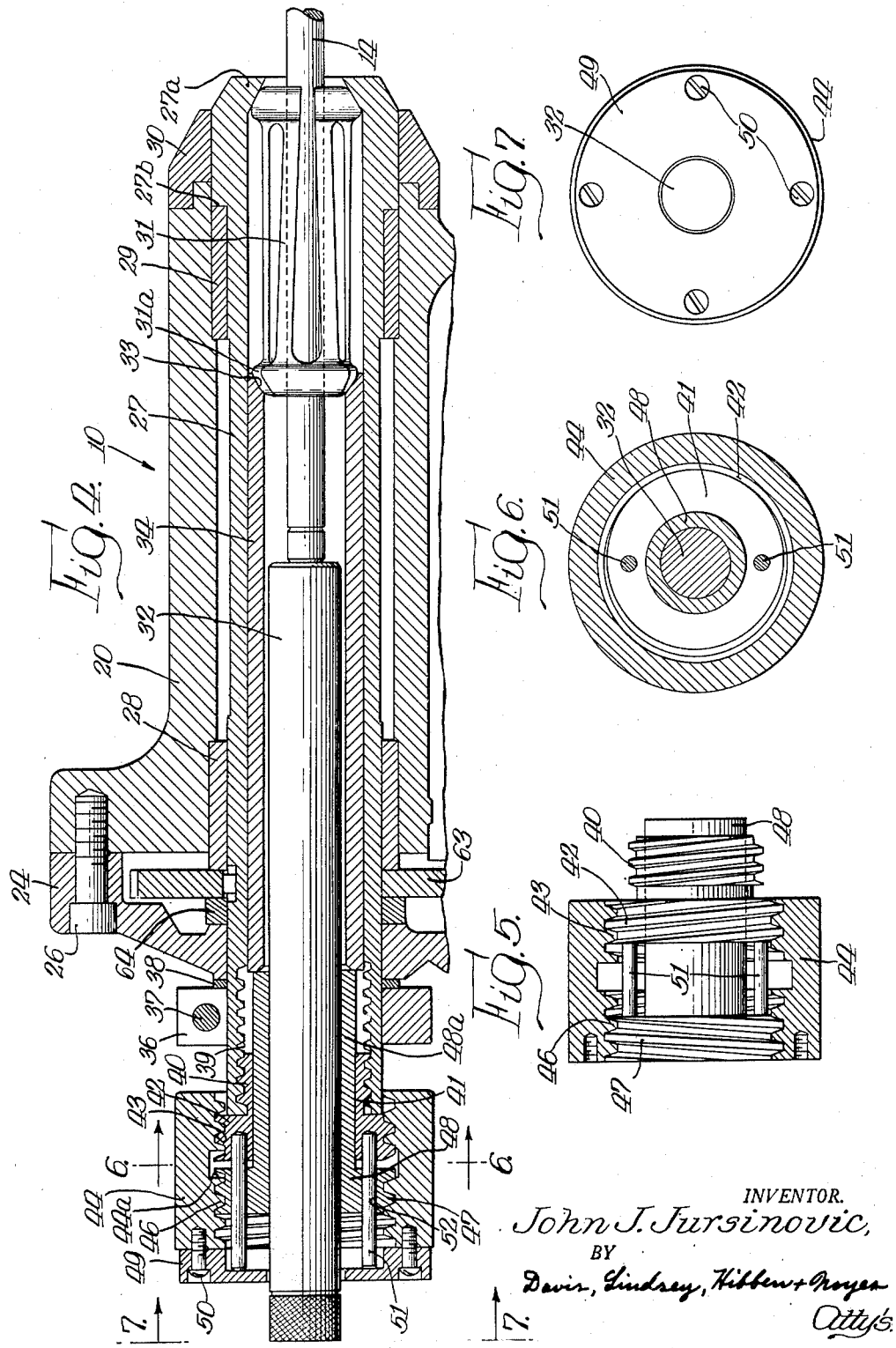

Patented Jan. 17, 1950

2,494,764

UNITED STATES PATENT OFFICE 2,494,764

CONTROL MECHANISM FOR CHUCKS

John J. Jursinovic, Aurora, Ill., assignor to Independent Pneumatic Tool Company, Aurora, Ill., a corporation of Delaware Application July 3, 1948, Serial No. 36,948

11 Claims. (Cl. 279—50)

This invention relates to a chuck construction and more particularly to an improved clamping control mechanism for tightening or opening the chuck when a piece of work is being clamped therein or removed therefrom, respectively. The present invention has been specifically applied to the rotatable holder of the valve grinding and refacing machine disclosed in detail in copending application Serial No. 775,072, filed September 19, 1947, and in my copending application Serial No. 774,469, filed September 17, 1947, and is an improvement over the form of the control mechanism for the chuck tightening means disclosed in each of said applications.

In operation of the chuck constructions disclosed in said applications and in similar constructions also in use similar types of machines, it has been found that an excessive number of turns of the hand wheels are required in order to completely tighten the clamping collet around the valve stem in preparation for grinding the tapered valve seat face on the valve head, the same excessive number of turns also being required when the valve stem is being removed from the chuck. Because of this excessive requirement, an operator of the valve grinding and refacing machine is not only subjected to unnecessary physical exertion, but his productive capacity is unduly limited as a result of the extra amount of time required to clamp and unclamp a valve stem. While the extra time required for each operation was relatively small, its sum total for all the operations throughout a working day was considerable, thus increasing the repair costs per valve.

It is, therefore, one of the objects of the present invention to provide an improved clamping control mechanism for tightening or loosening a chuck.

Another object of the present invention is to provide a chuck embodying an improved form of tightening or loosening means which may be operated by rotation of a control member to an extent less than one revolution.

Still another object is to provide a clamping control mechanism for a chuck comprising a rotatable control sleeve having two internally threaded portions pitched at angles opposite to each other, and a fixed threaded portion and a threaded portion of a clamping thrust member in threaded engagement with the two oppositely threaded sleeve portions, respectively, whereby the control sleeve upon minimum rotation moves toward the clamping means of the chuck and the thrust means is carried by and moves ahead of the control sleeve in the same direction to a greater maximum degree to effect clamping movement of the clamping means.

Other and further objects and advantages of the present invention will become apparent as the description progresses, reference being had to accompanying drawings, in which:

Figure 1 is a front elevational view of a portion of a valve grinding and refacing machine showing a rotatable chuck mechanism to which the improved chuck tightening and loosening means comprising the present invention is applied;

Fig. 2 is an enlarged top plan view of the rearward portion chuck mechanism shown in Fig. 1, the housing therefor being shown in horizontal section taken on the line 2—2 in Fig. 1;

Fig. 3 is an enlarged vertical sectional view of the entire chuck mechanism, the collet thereof being shown in open, non-clamping position and with a valve stem inserted therein;

Fig. 4 is an enlarged fragmentary, vertical sectional view of the chuck mechanism similar to Fig. 3 but showing the respective positions occupied by the respective parts when the collet is tightly clamped about a valve stem;

Fig. 5 is a side elevational view of the rotatable control sleeve and threaded bushing comprising a portion of the chuck tightening and loosening mechanism, the sleeve being shown in vertical section;

Fig. 6 is a vertical sectional view taken on the line 6—6 in Fig. 4, looking in the direction of the arrows;

Fig. 7 is an end elevational view looking in the direction of the arrows from the line 7—7 in Fig. 4; and Fig. 8 is a vertical sectional view taken on the line 8—8 in Fig. 2, looking in the direction of the arrows.

As shown generally in Fig. 1 of the drawings, the valve holder mechanism 10, to which the improved chuck tightening and loosening mechanism comprising a preferred embodiment of the present invention has been applied, is pivotally mounted on the top of a slidable carriage 11 which is supported for longitudinal slidable movement on an upstanding machine base 12. Movement of the carriage 11 longitudinally to the right or to the left, as viewed in Fig. 1, is controlled by a hand lever 13, and by this movement the tapered valve seat face of a valve 14 may be brought into or removed from grinding contact with a grinding wheel 15. The grinding wheel 16 is rotatably mounted in a housing 17 secured on the upper surface of a slidable carriage 18, this latter carriage being slidable on the base 12 forwardly and rearwardly transversely of the machine under the control of a hand lever 19. The grinding wheel may be driven by an electric motor (not shown) through the proper driving connections (not shown) as disclosed in said copending application Serial No. 775,072.

As shown more specifically in Fig. 3, the valve holder 10 comprises an upstanding housing 20 that is pivotally secured at its lower right or inner end on an upstanding stud 21 in the slide 11, while the outer or left end of the housing 20 is slidably supported on an arcuate slideway 22 slightly raised above the upper surface of the slide 11. This arrangement permits the valve holder 10 to be pivoted about the stud 21 to present the valve seat face of the valve 14 to the grinding wheel 16 at the desired grinding angle. In order to maintain the valve holder 10 in its properly adjusted position, there is provided a clamp nut 23 threadedly engaged on the upper threaded end of the stud 21, which nut may be tightened down against the upwardly projecting portion of the housing 20. The left or outer end of the housing 20 is closed by a vertical cover plate 24 secured to the housing 20 by a plurality of cap screws 26.

In the upper part of the valve holder housing 20, there is mounted for rotative movement a horizontally extending hollow spindle 27, the respective ends of which project beyond the housing 20 and the cover plate 24. The spindle 27 is supported for rotative movement within spaced bushings 28 and 29 secured within the housing 20 at each end thereof and adjacent its inner or right end it is encircled by a dust cap 30 secured to the right end of the housing 20. An elongated, resilient collet 31 or clamping means is positioned for limited slidable movement within the spindle 27 at the right end thereof and its movement out of the open right end of the spindle is prevented by the restricted opening formed by the inwardly tapered end walls 27a.

As shown in Figs. 3 and 4 of the drawings, the stem of a valve 14 may be inserted through the open restricted end 27a of the spindle 27 and through the collet 31 until its end projects well beyond the left end of the collet 31. The extent to which the valve 14 may be inserted within the spindle 27 is limited by an elongated stop rod 32 which is adjustably supported within the left portion of the spindle 27 and which may be moved to any desired position within the spindle. Thus, when the stem of a valve 14 has been inserted within the spindle 27 the desired distance so that the valve head is in proper position for grinding, the stop rod 32 may be pushed in from the left up against the end of the valve stem. When the valve has been ground, it is removed and the next valve of the same group inserted until the end of its stem is engaged by the stop rod 32, the relative position of the stop rod 32 not being disturbed during the grinding of an entire set of valves 14 to accomplish uniform grinding thereof.

The inner or left end of the collet 31 is adapted to be frictionally engaged by and received within the outwardly tapered end wall 33 of an elongated sleeve 34 positioned within the intermediate portion of the spindle 27 and adapted for slidable movement relative thereto and for rotative movement therewith. When the collet 31 is in its open, non-clamping position, as shown in Fig. 3 of the drawings, its rounded left end 31a is in engagement with the extreme end of the sleeve 34 and its rounded right end 31b is in engagement with the inner portion of the tapered spindle wall 27a, the ends 31a and 31b being in expanded condition. However, as the slidable sleeve 34 is forced to the right, by the clamping control mechanism comprising a preferred embodiment of the present invention and which will be described in detail hereinafter, the collet 31 is also forced to the right and is compressed between the tapered end wall 33 of the sleeve 34 and the tapered end wall 27a of the spindle 27. In this compressed position, shown particularly in Fig. 4 of the drawings, the left end of the collet 31 is forced partially within the end opening of the sleeve 34 and the right end of the collet is forced closer to the spindel opening, the valve 14 being thus tightly clamped by the collet 31 for rotative movement with the spindle.

The spindle 27 is restrained against longitudinal or endwise movement relative to the housing 20 by means of an annular shoulder 27b on the spindle 27 which engages the right end of the bushing 29 and by means of a split annular collar 36 which is drawn tightly around the spindle 27 adjacent its left end by a screw 37. The retaining collar 36 thus rotates with the spindle 27 and is spaced from the rear cover plate 24 by a bearing washer 38.

The left end portion of the bore of the spindle 27 is threaded, as indicated by the reference numeral 39, and is engaged with the reduced threaded end portion 40 of an annular bushing 41. The bushing 41 is of larger external diameter at its left end portion 42 which is also threaded and in engagement with a threaded portion 43 within the right end portion of a rotatable outer control sleeve or collar 44. The control sleeve 44 is also provided with internal threads 46 at its left portion which engage the enlarged threaded left end 47 of an inner thrust sleeve 48, this latter sleeve 48 having an elongated portion 48a of reduced diameter extending to the right through and within the annular bushing 41 and within the left end of the spindel 27. Between the threaded portions 43 and 46 within the control sleeve 44, there is an annular space 44a into which the threaded portions 42 and 47 of the bushing 41 and the inner sleeve 48, respectively, may move toward and away from each other in moving from their Fig. 3 positions to their Fig. 4 positions and return.

The outer periphery of the control sleeve 44 is knurled to provide a gripping surface for the operator, and a cover plate 49 is secured to the left end wall thereof by a plurality of screws 50. Two diametrically opposed guide pins 51 are fixedly secured within the left end walls of the bushing 41 and extend longitudinally to the left through diametrically opposed longitudinal openings 52 in the enlarged portion of the inner sleeve 48. By means of the guide pins 51, the inner sleeve 48 is held against rotation relative to the fixed bushing 40 but is adapted to move longitudinally thereof toward or away from threaded portion 42 of the bushing 41. The guide pins 51 also serve to limit the extent to which the inner sleeve 48 and the bushing 41 may be moved toward each other by engagement with the inner surface of the cover plate 49, in which position the sleeve 48 and the bushing 41 are still spaced a short distance from each other within the annular channel 44a of the control sleeve 44, as shown in Fig. 4.

As shown clearly in Fig. 5 of the drawings, the threads 42 of the bushing 41 and the threads 43 of the control sleeve 44 are right hand threads, while the threads 47 of the inner sleeve 48 and the threads 46 of the control sleeve 44 are left hand threads, all of the threads being of relatively steep pitch for maximum longitudinal movement. Hence, when the parts are in their Fig. 3 positions and the control sleeve or collar 44 is then rotated toward the operator or in a clockwise direction as viewed from the left end of the valve holder, the control sleeve 44 moves to the right over and relative to the fixed threaded portion 42 of the fixed bushing 41, the threaded portion 42 of which, as a result of this relative movement, occupying a position nearer the central portion of the sleeve 44. Simultaneously, as the sleeve or control collar 44 moves by rotation to the right, the inner sleeve portion 47, which is held against rotation by the pins 51, will also move inwardly to the right relative to the sleeve 44 toward the central portion thereof, with the result that the inner sleeve 48 will move to the right to a greater extent than the control sleeve 44. In other words, the control sleeve 44 supports and carries the inner sleeve 48 along with it, and because of its rotation forces the inner sleeve 48 to actually move ahead to a greater extent even though rotation of the control collar 44 is relatively slight. As a consequence of this construction, a considerable degree of longitudinal movement of the inner sleeve 48 is effected by a minimum of rotation of the control sleeve 44. Another factor contributory to the accomplishment of the relatively great longitudinal movement of the inner sleeve 48 is steep pitch of the threads 42 and 43 and the threads 46 and 47.

As the inner sleeve 48 is rapidly moved to the right, the right end of its reduced portion 48a moves inwardly of the spindle 27 and engages the left end of the elongated sleeve 34, and upon continued rotation of the control sleeve 44 the elongated sleeve 34 is forced to the right, thus contracting the collet 31 into clamping engagement with the valve stem 14. Because of the extraordinary degree of longitudinal movement of the thrust means comprising the inner sleeve 48 and the sleeve 34 that is effected by the novel mechanism comprising the present invention, the control sleeve 44 need only be rotated by the operator to an extent less than one revolution, and hence the valve 14 may be quickly tightened in the chuck, as shown in Fig. 4, with a minimum of time and effort. Likewise, in order to open the collet 31 so as to unclamp the valve 14 and permit its removal, the control collar 44 need be rotated in the opposite direction only to a limited extent until the parts reach their Fig. 3 positions.

As shown more paricularly in Figs. 3 and 4 of the drawings, the stop rod 32 also extends through the central opening of the inner sleeve 48 and is maintained in frictional engagement therewith by spring pressed balls 54 mounted in the stop rod 32 and thrust outwardly into engagement with the inner surface of the inner sleeve 48. The stop rod 32 thus may be pushed to the desired adjusted position within the slidable sleeve 34, after which it is retained in that position by the balls 54. When the inner sleeve 48 is moved to the right by rotation of the control sleeve 44, the stop rod 32 is also carried to the right until it engages the inner end of the valve stem. If the valve 14 has been inserted too far into the collet 31 the stop rod 32 will force the valve outwardly to the desired extent before it is fully clamped by the collet 31.

Rotation of the rotatable spindle 27 and the valve 14 is effected by an electric motor 56 mounted in the lower portion of the housing 20. The armature shaft 57 of the motor projects into a bore 58 in the cover plate 24 and a pinion gear 59 is secured on the shaft 57 and meshes with an idler gear 60 fixed on a rotatable shaft 61 supported in and projecting inwardly from the cover plate 24. Another pinion gear 62 is fixed on the shaft 61 inwardly of the idler gear 60 and is in mesh with a larger gear 63 fixed on the spindle 27, this larger gear being maintained in spaced relation from the cover plate 24 by a spacing collar 64. Thus, upon operation of the motor 56, rotation of the spindle 27 is effected through the armature shaft 57, pinion gear 59, idler gear 60, pinion gear 62 and the large spindle gear 63. Upon rotation of the spindle, the clamped valve 14 is also rotated as well as the clamping control collar 44 and the other associated elements above described.

Although there has been illustrated in the drawings and described in detail above a preferred embodiment of a clamping control means for a rotatable chuck in connection with a valve grinding machine, it is to be understood that changes and modifications in details of structure and mode of operation may be made, or the structure incorporated in chucks of other types of tools and machines, without departing from the spirit and scope of the appended claims.

I claim:

1. In a chuck having a clamping means adapted to be clamped and unclamped about an element, a clamping control mechanism comprising movable thrust means having a threaded portion and adapted to be moved relative to said clamping means to effect clamping movement thereof, a fixed threaded supporting portion, an annular, rotatable control member threadedly engaged with said fixed threaded portion for movement toward and away from the clamping means upon rotation of said control member and also threadedly engaged with said thrust means, the threads of the fixed supporting portion and the thread of said control member engaged therewith being of one hand and the threads of the thrust means and the other threaded portion of the control member being of opposite hand, said control member upon rotation thereof in one direction being adapted to be moved toward the clamping means and said thrust means upon said rotation of said control member being adapted to be moved in said same one direction relative to and ahead of said control member for effecting clamping movement of the clamping means.

2. In a chuck having a clamping means adapted to be clamped and unclamped about an element and a movable member for effecting clamping movement of the clamping means, a clamping control mechanism comprising a fixed threaded supporting portion, an annular, rotatable control member threadedly engaged with said threaded portion for movement toward and away from the clamping means upon rotation of said member and a thrust member also threadedly engaged with said control member and adapted for movement relative to the control member upon rotation thereof, said control member upon rotation thereof in one direction being adapted to be moved toward the clamping means and said thrust member upon rotation of said control member in said one direction being adapted to be moved in said same one direction relative to and ahead of said control member into engagement with the slidable member for effecting clamping movement thereof.

3. In a chuck having a clamping means adapted to be clamped and unclamped about an element, a clamping control mechanism comprising movable thrust means adapted upon movement thereof to bear at one end against said clamping means to effect clamping movement thereof and having a threaded portion adjacent the other end thereof, a fixed threaded supporting portion, and an annular, rotatable control collar having one internally threaded portion in threaded engagement with said fixed threaded portion and another internally threaded portion in threaded engagement with the threaded portion of the thrust means, said control collar upon rotation thereof in one direction being adapted to be moved toward the clamping means and said thrust means upon said rotation of said control collar being adapted to be moved in said same one direction relative to and ahead of said control collar for effecting clamping movement of the clamping means.

4. In a chuck having a clamping means adapted to be clamped and unclamped about an element, a clamping control mechanism comprising movable thrust means adapted upon movement thereof to bear at one end against said clamping means to effect clamping movement thereof and having a threaded portion adjacent the other end thereof, a fixed threaded supporting portion, and an annular, rotatable control collar having one internally threaded portion in threaded engagement with said fixed threaded portion and another internally threaded portion in threaded engagement with the threaded portion of the thrust means, the threads of the fixed supporting portion and of said one threaded portion of the collar being of the opposite hand from the threads of the thrust means and of the other threaded portion of the collar, said control collar upon rotation thereof in one direction being adapted to be moved toward the clamping means and said thrust means upon said rotation of said control collar being adapted to be moved in said same one direction relative to and ahead of said control collar for effecting clamping movement of the clamping means.

5. In a chuck having a clamping means adapted to be clamped and unclamped about an element, a clamping control mechanism comprising movable thrust means adapted upon movement thereof to bear at one end against said clamping means to effect clamping movement thereof and having a threaded portion adjacent the other end thereof, a fixed threaded supporting portion, and an annular, rotatable control collar having one internally threaded portion in threaded engagement with said fixed threaded portion and another internally threaded portion in threaded engagement with the threaded portion of the thrust means, the threads of the fixed supporting portion and of said one threaded portion of the collar being right hand threads and the threads of the thrust means and of the other threaded portion of the collar being left hand threads, said control collar upon rotation thereof in one direction being adapted to be moved toward the clamping means and said thrust means upon said rotation of said control collar being adapted to be moved in said same one direction relative to and ahead of said control collar for effecting clamping movement of the clamping means.

6. In a chuck having a clamping means adapted to be clamped and unclamped about an element, a clamping control mechanism comprising movable thrust means adapted upon movement thereof to bear at one end against said clamping means to effect clamping movement thereof and having a threaded portion adjacent the other end thereof, a fixed threaded supporting portion, and an annular, rotatable control collar having one internally threaded portion in threaded engagement with said fixed threaded portion and another internally threaded portion in threaded engagement with the threaded portion of the thrust means, said threaded portion of the thrust means being fixed against rotation relative to said threaded supporting portion, and said control collar upon rotation thereof in one direction being adapted to be moved toward the clamping means and said thrust means upon said rotation of said control collar being adapted to be moved in said same one direction relative to and ahead of said control collar for effecting clamping movement of the clamping means.

7. In a chuck having a clamping means adapted to be clamped and unclamped about an element, a clamping control mechanism comprising movable thrust means adapted upon movement thereof to bear at one end against said clamping means to effect clamping movement thereof and having a threaded portion adjacent the other end thereof, a fixed threaded supporting portion, and an annular, rotatable control collar having one internally threaded portion in threaded engagement with said fixed threaded portion and another internally threaded portion in threaded engagement with the threaded portion of the thrust means, and locking means extending between said fixed threaded portion and said thrust means for preventing relative rotative movement therebetween but permitting longitudinal movement of said threaded portion of the thrust means toward and away from said fixed portion, said control collar upon rotation thereof in one direction being adapted to be moved toward the clamping means and said thrust means upon said rotation of said control collar being adapted to be moved in said same one direction relative to and ahead of said control collar for effecting clamping movement of the clamping means.

8. In a chuck having a clamping means adapted to be clamped and unclamped about an element, a clamping control mechanism comprising movable thrust means adapted upon movement thereof to bear at one end against said clamping means to effect clamping movement thereof and having a threaded portion adjacent the other end thereof, a fixed threaded supporting portion, and an annular, rotatable control collar having one internally threaded portion in threaded engagement with said fixed threaded portion and another internally threaded portion in threaded engagement with the threaded portion of the thrust means, and a plurality of pins secured in said fixed threaded portion and extending into said threaded portion and extending through said threaded portion of the thrust means in slidable relation therewith for preventing relative rotative movement therebetween but permitting longitudinal movement of said threaded portion of the thrust means toward and away from said fixed portion, and an abutment on said control collar adapted to be engaged by said pins for limiting the extent of movement of said threaded portion of the thrust means toward said fixed threaded portion, said control collar upon rotation thereof in one direction being adapted to be moved toward the clamping means and said thrust means upon said rotation of said control collar being adapted to be moved in said same one direction relative to and ahead of said control collar for effecting clamping movement of the clamping means.

9. In a chuck having a clamping means adapted to be clamped and unclamped about an element and a slide member for effecting clamping movement of the clamping means, a clamping control mechanism comprising a thrust member having a threaded portion at one end and adapted to bear against the slide member at its other end, a fixed threaded supporting portion in axial alignment with the threaded portion of the thrust member, said threaded portion of the thrust member being fixed against rotation relative to the fixed threaded portion but movable longitudinally toward and from said fixed portion, a rotatable actuating sleeve having an internally threaded portion at one end for threaded engagement with said fixed threaded portion and an internally threaded portion at its other end for threaded engagement with said thrust member, the threads of the fixed supporting portion and of said one threaded portion of the sleeve being pitched in the opposite direction than the threads of the thrust member and the other threaded portion of the collar, said actuating sleeve upon rotation thereof in one direction being adapted to move toward the clamping means and said thrust member upon said rotation of said sleeve being adapted to be moved in said one direction relative to and ahead of said sleeve for effecting sliding movement of the slide member.

10. In a chuck having a hollow spindle adapted to receive at one end the stem of a valve to be ground, a stem clamping means within the spindle at said one end adapted to be clamped and unclamped about said stem and an elongated slidable member within said spindle for effecting clamping movement of the stem clamping means; a clamping control mechanism comprising a fixed threaded portion at the other end of said spindle, a rotatable control collar threadedly engaged with said threaded portion and adapted to move longitudinally of the spindle upon rotation of the collar, and a thrust member threadedly supported by said control collar and adapted to move longitudinally of the control collar upon rotation thereof, the threads of the fixed threaded portion and the threads of the control collar engaged therewith being of one hand and the threads of the thrust member and the other threaded portion of the control collar being of opposite hand, said control collar upon rotation thereof in one direction being adapted to be moved longitudinally of the spindle toward the said one end thereof and said thrust member upon rotation of said collar in said one direction also being adapted to be moved longitudinally in the same direction of the spindle ahead of said moving collar into engagement with the slidable member.

11. In a chuck having a clamping means adapted to be clamped and unclamped about an element, a clamping control mechanism comprising movable thrust means adapted upon movement thereof to bear at one end against said clamping means to effect clamping movement thereof and having a threaded portion adjacent the other end thereof, a fixed threaded supporting portion, and an annular, rotatable control collar having one internally threaded portion in threaded engagement with said fixed threaded portion and another internally threaded portion in threaded engagement with the threaded portion of the thrust means, said control collar upon rotation thereof in one direction being adapted to be moved toward the clamping means and said thrust means upon said rotation of said control collar being adapted to be moved in said same one direction relative to and ahead of said control collar for effecting clamping movement of the clamping means, and a stop member adjustably carried by said thrust means for engaging and limiting the inward movement of an element relative to the clamping means as the thrust means is moved to effect clamping movement of the clamping means.

JOHN J. JURSINOVIC.

REFERENCES CITED

The following references are of record in the file of this patent:

UNITED STATES PATENTS

| Number | Name | Date |
| --- | --- | --- |
| 1,756,773 | Wendt | Apr. 29, 1930 |
| 2,383,156 | Phillips | Aug. 21, 1945 |
| 2,466,472 | Oster | Apr. 5, 1949 |

FOREIGN PATENTS

| Number | Country | Date |
| --- | --- | --- |
| 560,250 | Great Britain | Mar. 27, 1944 |